United States Patent [19]

Erasov et al.

[11] Patent Number: 4,462,773
[45] Date of Patent: Jul. 31, 1984

[54] PLANETARY HYDRAULIC MOTOR

[76] Inventors: Fedor N. Erasov, ulitsa Solnechnaya, 7/9, kv. 77; Viktor K. Levitsky, ulitsa Koroleva, 22, kv. 141; Sergei V. Skripkin, ulitsa Vishnevskogo, 11, kv. 51, all of Odessa, U.S.S.R.

[21] Appl. No.: 380,726

[22] PCT Filed: Aug. 21, 1981

[86] PCT No.: PCT/SU81/00068
§ 371 Date: May 13, 1982
§ 102(e) Date: May 13, 1982

[87] PCT Pub. No.: WO82/01030
PCT Pub. Date: Apr. 1, 1982

[30] Foreign Application Priority Data

Sep. 19, 1980 [SU] U.S.S.R. .............................. 2985013

[51] Int. Cl.³ .............................................. F03C 2/08
[52] U.S. Cl. .................... 418/61 B; 418/104; 418/131
[58] Field of Search ............... 418/61 B, 104, 131, 418/132; 277/2, 29, 177, 81

[56] References Cited

U.S. PATENT DOCUMENTS 2,956,512 10/1960 Brundage ........................... 418/132

FOREIGN PATENT DOCUMENTS 696179 11/1979 U.S.S.R. ........................... 418/61 B

Primary Examiner—John J. Vrablik
Assistant Examiner—John J. McGlew, Jr.
Attorney, Agent, or Firm—Lilling & Greenspan

[57] ABSTRACT

A planetary hydraulic motor comprises a housing (1) with a stator gear (2), the housing accommodating a shaft (3) having fixedly secured thereon a gear (4), a ring rotor (11) disposed eccentrically relative to the shaft (3) and two cover cups (5 and 6). The shaft (3) has a sealing assembly in the form of a thrust ring (7) secured in the cover cup (5) and a sleeve (8) having a cylindrical projection adjoining by the end face thereof the working surface of the thrust ring (7). Mounted on the outer surface of the cylindrical projection of the sleeve (8) is a ring element (20) fabricated from an elastic material. Provided in the sleeve (8) essentially under the ring (20) are passages (21) adapted to communicate a section of the inner surface of the ring (20) with the atmosphere.

1 Claim, 1 Drawing Figure

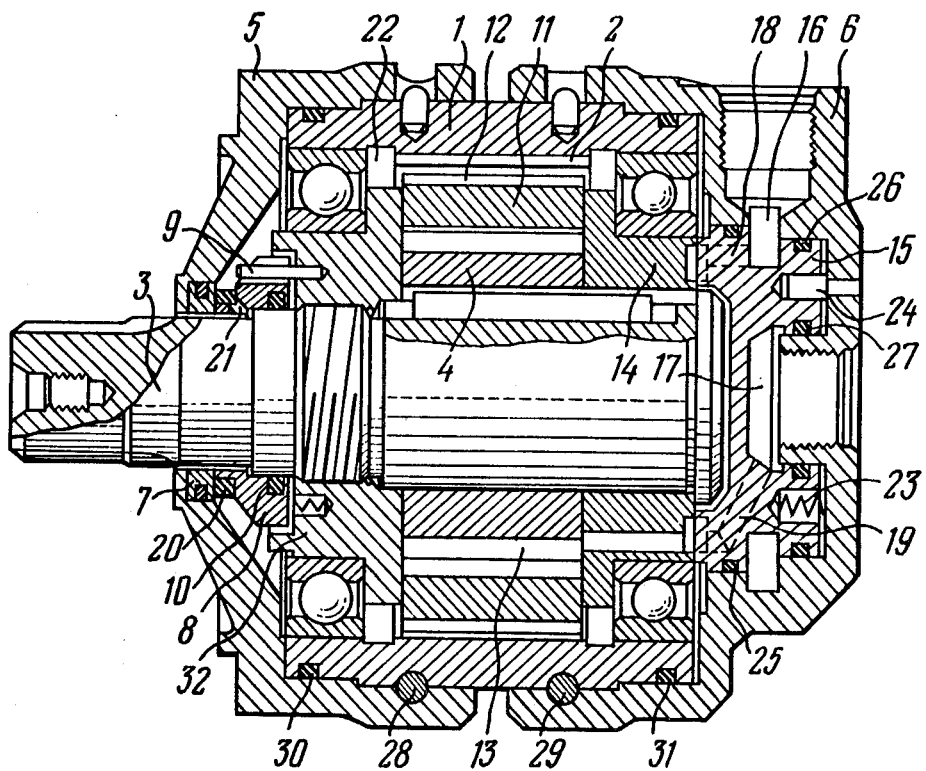

4,462,773

PLANETARY HYDRAULIC MOTOR

BACKGROUND OF THE INVENTION

1. Field of the Invention

This invention relates to hydraulic positive displacement machines, and more particularly to planetary hydraulic motors.

2. Prior Art

There are known planetary hydraulic motors comprising gear pairs of inner engagement and sealing assemblies of a rotating shaft. However, the above sealing assemblies fail to ensure reliable and durable operation of the hydraulic motors at high pressures in their interiors (cf. B. N. Birjukov "Rotary Hydraulic Machines" in Russian, published in 1972 by the Mashinostroenie Publishers, Moscow, see p. 28, FIG. 19; USSR Inventor's Certificate No. 449178, IPC F04C 1/00, published in Bulletin "Discoveries, Inventions, Industrial Designs and Trade Marks" No. 41, 1974—in Russian; and USSR Inventor's Certificate No. 595536, IPC F04C 1/00, published in Bulletin "Discoveries, Inventions, Industrial Designs and Trademarks" No. 8, 1978—in Russian).

A planetary hydraulic motor which is closest in its technical essence to the one claimed in this invention is exemplified in USSR Inventor's Certificate No. 696179, IPC F04C 1/00, published in Bulletin "Discoveries, Inventions, Industrial Designs and Trademarks" No. 41, 1979—in Russian. This planetary hydraulic motor comprises a housing with a stator gear, one side of the stator gear being covered by a cup intended for mounting the motor, the other side thereof being covered by a cup for feeding the motor with a working fluid. The housing incorporates a shaft having fixedly secured thereon a gear, a sealing assembly of the shaft in the form of a thrust ring disposed in the cup for mounting the motor, and a sleeve member having a cylindrical projection adjoining by the end face surface thereof the working surface of the thrust ring, the thrust ring being fabricated from fluoroplastic.

The above planetary hydraulic motor also comprises a ring rotor disposed eccentrically relative to the shaft to meshingly engage with the shaft gear and the stator gear, the stator gear and the outer toothing of the ring rotor forming a transmission gear pair, while the shaft gear and the inner toothing of the ring rotor define a gear pair having working chambers to feed the working fluid thereinto and discharge it therefrom, the working fluid being delivered from a valving mechanism including a fluid distributor fixedly secured on the shaft, and a valve disposed in the cup for feeding the working fluid.

Inherent in the known planetary hydraulic motors operating under high internal pressures and susceptible to radial beats of the shaft is a disadvantage residing in that the thrust ring wears out prematurely. This is accounted for by the fact that part of the fluoroplastic ring projected into a radial gap tends to be crumpled and damaged due to the beatings of the shaft resulting in a failure of the thrust ring. Therefore, the aforedescribed sealing assembly fails to provide reliable and durable operation of the planetary hydraulic motor.

SUMMARY OF THE INVENTION

The present invention is directed toward the provision of a planetary hydraulic motor featuring a shaft sealing assembly of greater reliability, durability and simplicity when the planetary motor operates at high working pressures in its interior by virtue of the employment of an elastic element and the arrangement thereof on a sealing sleeve.

This is attained by a planetary hydraulic motor which comprises a housing with a stator gear one side of which is covered by a cup intended for fixing the planetary hydraulic motor in working position, the other side thereof being covered by a cup for feeding a working fluid, a shaft arranged inside the housing and having a gear rigidly secured thereon, a sealing element of the shaft in the form of a thrust ring secured in the cup for fixing the planetary hydraulic motor in working position, a sleeve element having a cylindrical projection adjoining by an end face thereof the working surface of the thrust ring, the sleeve element being mounted on the shaft, a ring rotor disposed eccentrically relative to the shaft and meshingly engageable with the shaft gear and with the stator gear of the housing, the stator gear and an outer too-thing of the ring rotor forming a transmission gear pair, whereas the shaft gear and an inner toothing of the ring rotor define a gear pair with working chambers for the working fluid to be fed thereinto and discharged therefrom, the working fluid being delivered from a fluid valving mechanism including a fluid distributor fixedly secured on the shaft, and a valve arranged inside the cup for feeding the working fluid, according to the invention, mounted on the outer surface of the cylindrical projection of the sleeve element is a ring fabricated from an elastic material, the sleeve element being provided with passages under the ring, the passages being adapted to communicate a section of the inner surface of the ring with the atmosphere.

The provision of the above sealing assembly ensures reliable sealing and durability. The aforedescribed arrangement also simplifies the manufacture of the sealing assembly.

BRIEF DESCRIPTION OF THE ACCOMPANYING DRAWINGS

The invention will now be described in greater detail with reference to a specific preferred embodiment thereof taken in conjunction with the accompanying drawing in which there is shown a general longitudinal sectional view of a planetary hydraulic motor featuring a shaft sealing assembly.

DESCRIPTION OF THE PREFERRED EMBODIMENT

With reference to the accompanying drawing a planetary hydraulic motor comprises a housing 1 with a stator gear 2. Arranged inside the housing 1 is a shaft 3 having a gear 4 secured thereon. Arranged on one side of the stator gear 2 is a cover cup 5 for fixing the planetary hydraulic motor in position, while attached to the opposite side thereof is a cover cup 6 for feeding a working fluid.

The planetary hydraulic motor is further provided with shaft sealing elements in the form of a thrust ring 7 secured in the cover cup 5, and a sleeve 8 mounted on the shaft 3 and secured against relative rotation therewith by a pin 9 thereby causing the sleeve 8 to rotate together with the shaft 3. The sleeve 8 having arranged therein a sealing ring 10.

The sleeve 8 also has a cylindrical annular projection adapted to adjoin by an end face thereof the working surface of the thrust ring 7.

The planetary hydraulic motor further comprises a ring rotor 11 arranged eccentrically relative to the shaft 3 and engageable with the shaft gear 4 and the stator gear 2. The stator gear 2 and an outer toothing 12 of the ring rotor 11 make up a transmission gear pair, whereas the shaft gear 4 and an inner toothing of the ring rotor 11 form a gear pair with working chambers 13 of varible volume for the working fluid to be supplied thereinto and discharged therefrom, the working fluid being delivered from a valving mechanism including a distributor 14 secured on the shaft 3, and a valve 15 disposed in the cover cup 6.

The movable distributor 14 is brought into contact with the stationary valve 15 secured in the cover cup 6 in such a manner as to form cavities 16 and 17 therebetween communicating with passages 18 and 19 to supply and discharge the working fluid.

Secured on the outer surface of the cylindrical projection of the sleeve 8 is a ring element 20 fabricated from an elastic material, while passages 21 are provided below the ring 20 to connect a section of the inner surface of the ring 20 with the atmosphere thanks to which the pressure of the working fluid in the interior 22 of the planetary hydraulic motor acts to urge the ring 20 to the sleeve 8 and is prevented from rotation relative to this sleeve 8. The ring 20 is from 0.2 to 0.4 mm longer in axial length than the axial length of the outer mounting surface of cylindrical projection of the sleeve 8 thereby providing reliable sealing even during operation of the planetary hydraulic motor immediately subsequent to its assembly.

Preliminary urging of the valve 15 toward the working surface of the distributor 14 is effected by means of springs 23. The valve 15 is fixed against rotation by a pin 24 and is provided with seals 25, 26 and 27.

The cover cups are secured against displacement by annular keys 28 and 29.

The seal between the housing 1 and the cover cups 5 and 6 is ensured by the provision of sealing elements 30 and 31. The working chambers 13 are covered on the side of the cup 5 by a wear plate 32.

The planetary hydraulic motor according to the invention operates as follows.

The working fluid is conveyed from the cavity 16 through the passages 18 of the valve 15 to one half of the working chambers 13 disposed on one side of the symmetry plane of the gear pair, particularly the gear 4 and the rotor 11. Under the action of the pressure of the working fluid in the chambers 13 the rotor 11 is caused to roll simultaneously on the stator gear 2 of the housing and on the toothing of the gear 4 transmitting rotation to the shaft 3. The working fluid is forced via the passages 19 of the valve 15 into the cavity 17 for discharge. A certain amount of overpressure is produced in the interior 22 of the planetary hydraulic motor due to leaks of the working fluid which are not drained, the value of this pressure being close to the feeding pressure, whereby the ring 20 is pressed to the sleeve 8 thanks to the provision of the passages 21; the ring 20 being thus urged together with the sleeve 8 toward the thrust ring 7 providing reliable sealing to the rotating shaft 3.

As the ring 20 which originally is greater in length than the projection or neck portion of the sleeve 8 wears out, its function is taken over by the sleeve 8 per se. From this moment on the two end face surfaces of the ring 20 and the sleeve 8 are slidingly engaged with the thrust ring 7.

The above sealing assembly provides reliable sealing throughout the service life of the planetary hydraulic motor. It also features extended durability and simplified construction of the sealing elements and cuts down on the labour costs involved during manufacture.

INDUSTRIAL APPLICABILITY

The planetary hydraulic motor can find application in aviation, heavy machine building, shipbuilding and agriculture as a direct-drive for the implements of mechanical actuators. It also can be built directly into drive wheels or into a winch drum.

We claim:

1. A planetary hydraulic motor comprising a housing with a stator gear one side of which is covered by a cup intended for fixing the planetary hydraulic motor in working position, the other side thereof being covered by a cup for feeding the motor with a working fluid, a shaft arranged inside the housing and having rigidly secured thereon a gear, a sealing element of the shaft in the form of a thrust ring secured in the cup for fixing the planetary hydraulic motor in working position, a sleeve element having a cylindrical projection adjoining by an end face thereof the working surface of the thrust ring, the sleeve element being mounted on the shaft, a ring rotor disposed eccentrically relative to the shaft and engageable with the shaft gear and with the stator gear of the housing, the stator gear and an outer toothing of the ring rotor forming a transmission gear pair, whereas the shaft gear and an inner toothing of the ring rotor define a gear pair with working chambers for the working fluid to be fed thereinto and discharged therefrom, the working fluid being delivered from a fluid valving mechanism including a fluid distributor fixedly secured on the shaft, and a valve arranged inside the cup for feeding the working fluid, characterized in that mounted on the outer surface of the cylindrical projection of the sleeve element (8) is a ring (20) fabricated from an elastic material, the sleeve element (8) being provided with passages (21) under the ring (20), the passages (21) being adapted to communicate a section of the inner surface of the ring (20) with the atmosphere.

* * * * *